US011153627B2

(12) United States Patent
Alam et al.

(10) Patent No.: US 11,153,627 B2
(45) Date of Patent: *Oct. 19, 2021

(54) SYSTEM AND METHOD FOR SWITCHING VIDEO PRESENTATIONS BETWEEN DEVICES

(71) Applicant: AT&T Mobility II LLC, Atlanta, GA (US)

(72) Inventors: Iftekhar Alam, Atlanta, GA (US); Ming-Ju Ho, Alpharetta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/031,522

(22) Filed: Sep. 24, 2020

(65) Prior Publication Data
US 2021/0006854 A1    Jan. 7, 2021

Related U.S. Application Data

(63) Continuation of application No. 16/879,421, filed on May 20, 2020, now Pat. No. 10,820,033, which is a
(Continued)

(51) Int. Cl.
*H04N 21/41* (2011.01)
*H04N 21/436* (2011.01)
(Continued)

(52) U.S. Cl.
CPC ..... *H04N 21/4126* (2013.01); *H04N 21/2187* (2013.01); *H04N 21/4333* (2013.01);
(Continued)

(58) Field of Classification Search
CPC ........... H04N 21/2187; H04N 21/4126; H04N 21/4333; H04N 21/43615; H04N 21/47217
See application file for complete search history.

(56) References Cited

U.S. PATENT DOCUMENTS 7,212,783 B2    5/2007    Clayton et al.
7,383,983 B2    6/2008    Clayton et al.
(Continued)

FOREIGN PATENT DOCUMENTS

CN            105354002 A    2/2016

*Primary Examiner* — Nicholas T Corbo
(74) *Attorney, Agent, or Firm* — Guntin & Gust, PLC; Matthew Tropper

(57) ABSTRACT

Aspects of the subject disclosure may include, for example, a method in which a processing system receives a signal transmitted from a first media presentation device presenting media content; the signal includes a request to discontinue providing the media content to the first media presentation device and begin providing the media content to a second media presentation device. The method also includes transmitting a link to a destination associated with the second device, and transmitting a portion of the media content to the second device; this portion corresponds to a predetermined time period commencing with transmission of the signal. In response to selection of the link, the media content portion is presented at the second device, and the media content is provided to the second device corresponding to a time period commencing with expiration of the predetermined time period. Other embodiments are disclosed.

20 Claims, 9 Drawing Sheets

Related U.S. Application Data continuation of application No. 15/441,423, filed on Feb. 24, 2017, now Pat. No. 10,701,428.

(51) Int. Cl.
| | |
|---|---|
| *H04N 21/2187* | (2011.01) |
| *H04N 21/472* | (2011.01) |
| *H04N 21/433* | (2011.01) |
| *H04N 21/647* | (2011.01) |

(52) U.S. Cl.
CPC . *H04N 21/43615* (2013.01); *H04N 21/47217* (2013.01); *H04N 21/647* (2013.01)

(56) References Cited

U.S. PATENT DOCUMENTS

| | | |
|---:|---|---|
| 8,613,028 B2 | 12/2013 | Dodd et al. |
| 9,118,969 B2 | 8/2015 | Rumreich |
| 2004/0170400 A1 | 9/2004 | Takeuchi |
| 2007/0067808 A1 | 3/2007 | Dacosta |
| 2007/0198682 A1 | 8/2007 | Pazhyannur et al. |
| 2009/0232481 A1 | 9/2009 | Baalbergen et al. |
| 2009/0241149 A1 | 9/2009 | Yoshioka et al. |
| 2010/0154021 A1 | 6/2010 | Howarter et al. |
| 2012/0072944 A1 | 3/2012 | Felt et al. |
| 2012/0227080 A1 | 9/2012 | Endo et al. |
| 2013/0111520 A1 | 5/2013 | Lo et al. |
| 2014/0105561 A1 | 4/2014 | Chen et al. |
| 2014/0115114 A1 | 4/2014 | Garmark et al. |
| 2016/0037209 A1 | 2/2016 | Miyoshi |
| 2016/0302166 A1 | 10/2016 | Dang |
| 2017/0332140 A1 | 11/2017 | Blake et al. |
| 2018/0249197 A1 | 8/2018 | Alam et al. |
| 2020/0280754 A1 | 9/2020 | Alam et al. |

400

700

SYSTEM AND METHOD FOR SWITCHING VIDEO PRESENTATIONS BETWEEN DEVICES

CROSS REFERENCE TO RELATED APPLICATION(S)

This application is a continuation of U.S. patent application Ser. No. 16/879,421, filed on May 20, 2020, which is a continuation of U.S. patent application Ser. No. 15/441,423 (now U.S. Pat. No. 10,701,428), filed on Feb. 24, 2017. All sections of the aforementioned application(s) and/or patent(s) are incorporated herein by reference in their entirety.

FIELD OF THE DISCLOSURE

The subject disclosure relates to mobile communication devices, and more specifically to a system and method for switching between devices when viewing video content, particularly live content.

BACKGROUND

A consumer of video content (often a subscriber to a content provider service) may have multiple devices that can present content, both inside the home and elsewhere (e.g. installed in an automobile). If a subscriber is watching a program at home but needs to leave the home to go on an errand by car, he will want to start watching the program on the car's device without missing any content.

BRIEF DESCRIPTION OF THE DRAWINGS

Reference will now be made to the accompanying drawings, which are not necessarily drawn to scale, and wherein.

DETAILED DESCRIPTION

Figure 1:
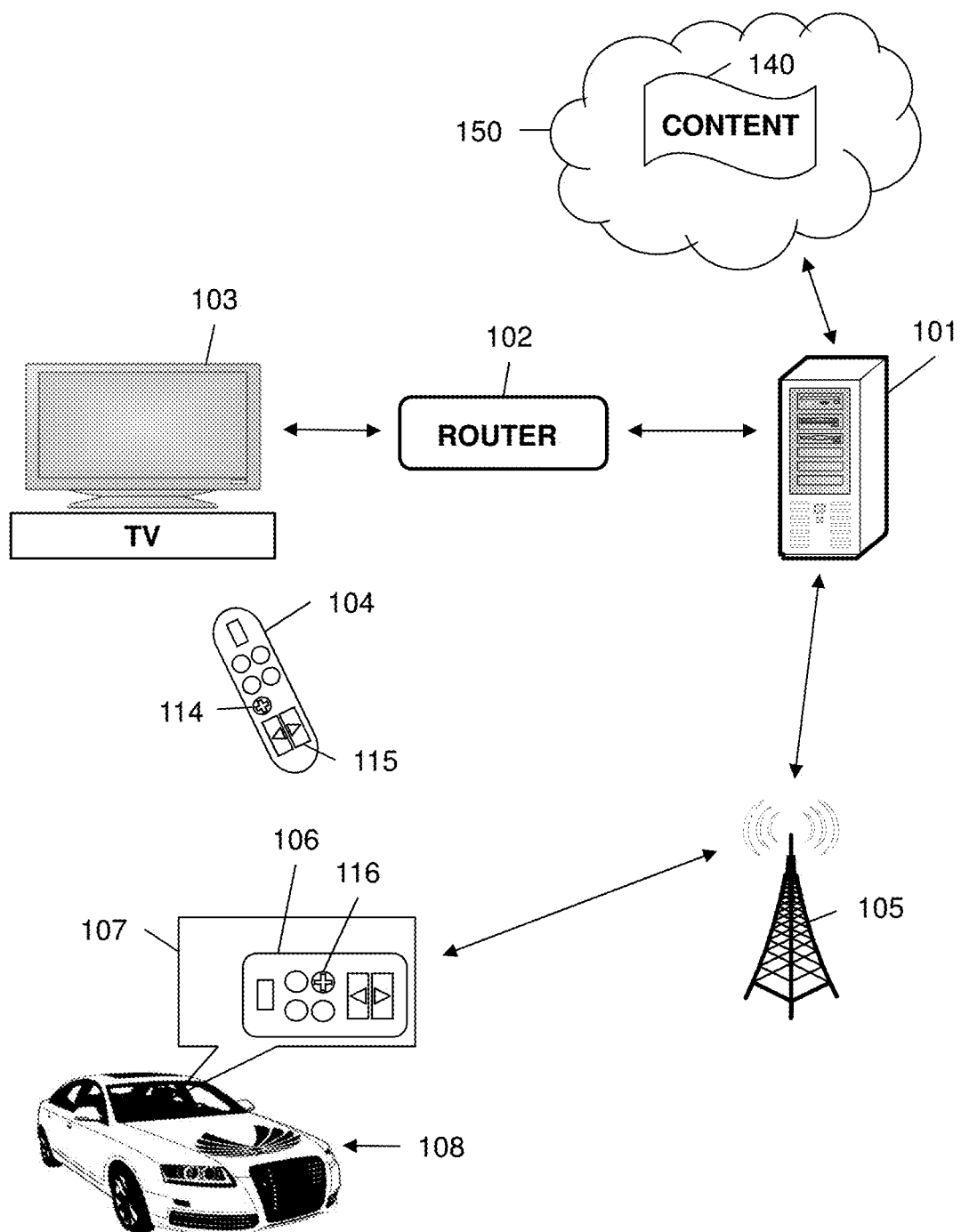
FIG. 1 schematically illustrates a system for delivering content to a home device and a car device, in accordance with embodiments of the disclosure.

The subject disclosure describes, among other things, illustrative embodiments for switching presentation of media content from one presentation device to another, without the viewer missing any of the content. Other embodiments are described in the subject disclosure.

One or more aspects of the subject disclosure include a method comprising receiving, by a processing system including a processor, a signal transmitted from a first media presentation device presenting media content; the signal includes a request to discontinue providing the media content to the first media presentation device and begin providing the media content to a second media presentation device. The method also comprises transmitting a selectable software object to a destination associated with the second media presentation device, and transmitting a portion of the media content to the second media presentation device; the portion of the media content corresponds to a predetermined time period commencing with transmission of the signal. The method further comprises providing, responsive to selection of the software object, the media content to the second media presentation device. The second media presentation device presents the portion of the media content in response to the selection of the software object, and the media content provided to the second media presentation device responsive to selection of the software object corresponds to a time period commencing with expiration of the predetermined time period.

One or more aspects of the subject disclosure include a device comprising a processing system including a processor, and a memory that stores executable instructions that, when executed by the processing system, facilitate performance of operations. The operations comprise receiving a signal transmitted from a first media presentation device presenting media content; the signal comprises a request to discontinue providing the media content to the first media presentation device and begin providing the media content to a second media presentation device. The operations also comprise transmitting a selectable software object to a destination associated with the second media presentation device; the destination is an address or a mobile phone number designated by a user of the second media presentation device. The operations further comprise transmitting a portion of the media content to the second media presentation device; the portion of the media content corresponds to a predetermined time period commencing with transmission of the signal. The operations also comprise providing the media content to the second media presentation device, responsive to selection of the software object. A single user input to the second media presentation device represents selection of the software object, the second media presentation device presents the portion of the media content in response to the selection of the software object, and the media content provided to the second media presentation device responsive to selection of the software object corresponds to a time period commencing with expiration of the predetermined time period.

One or more aspects of the subject disclosure include a machine-readable storage medium comprising executable instructions that, when executed by a processing system including a processor, facilitate performance of operations. The operations comprise receiving a signal transmitted from a first media presentation device presenting media content; the signal comprises a request to discontinue providing the media content to the first media presentation device and begin providing the media content to a second media presentation device. The operations also comprise transmitting a selectable software object to a destination associated with the second media presentation device, and transmitting a portion of the media content to the second media presentation device; the portion of the media content corresponds to a predetermined time period or a predetermined number of frames with a starting point and an ending point, the starting point corresponding to transmission of the signal. The operations further comprise providing, responsive to selection of the software object, the media content to the second media presentation device; the second media presentation device presents the portion of the media content in response to the selection of the software object, and the media content provided to the second media presentation device responsive to selection of the software object corresponds to a time period commencing with the ending point of the portion of media content.

FIG. 1 schematically illustrates a system 100 according to an embodiment of the disclosure, in which a content provider server 101 can obtain video content 140 from cloud 150 via a network, and direct the content to video equipment in a user's home or a user's car. In this embodiment, the content is transmitted to a video presentation device in the user's home via a router 102; the content is presented at a television display 103 controlled by a remote control 104. Content can also be transmitted on a cellular network (e.g. via base station 105) to a mobile video presentation device 107 in the user's car 108; the mobile device is controlled using a control panel (e.g. installed in the car's dashboard) 106. As shown in FIG. 1, remote control 104 includes a button 114 and the mobile device control panel 106 includes a button 116. In an embodiment, these buttons are used to switch presentation of the video content from one device to another.

Figure 2:
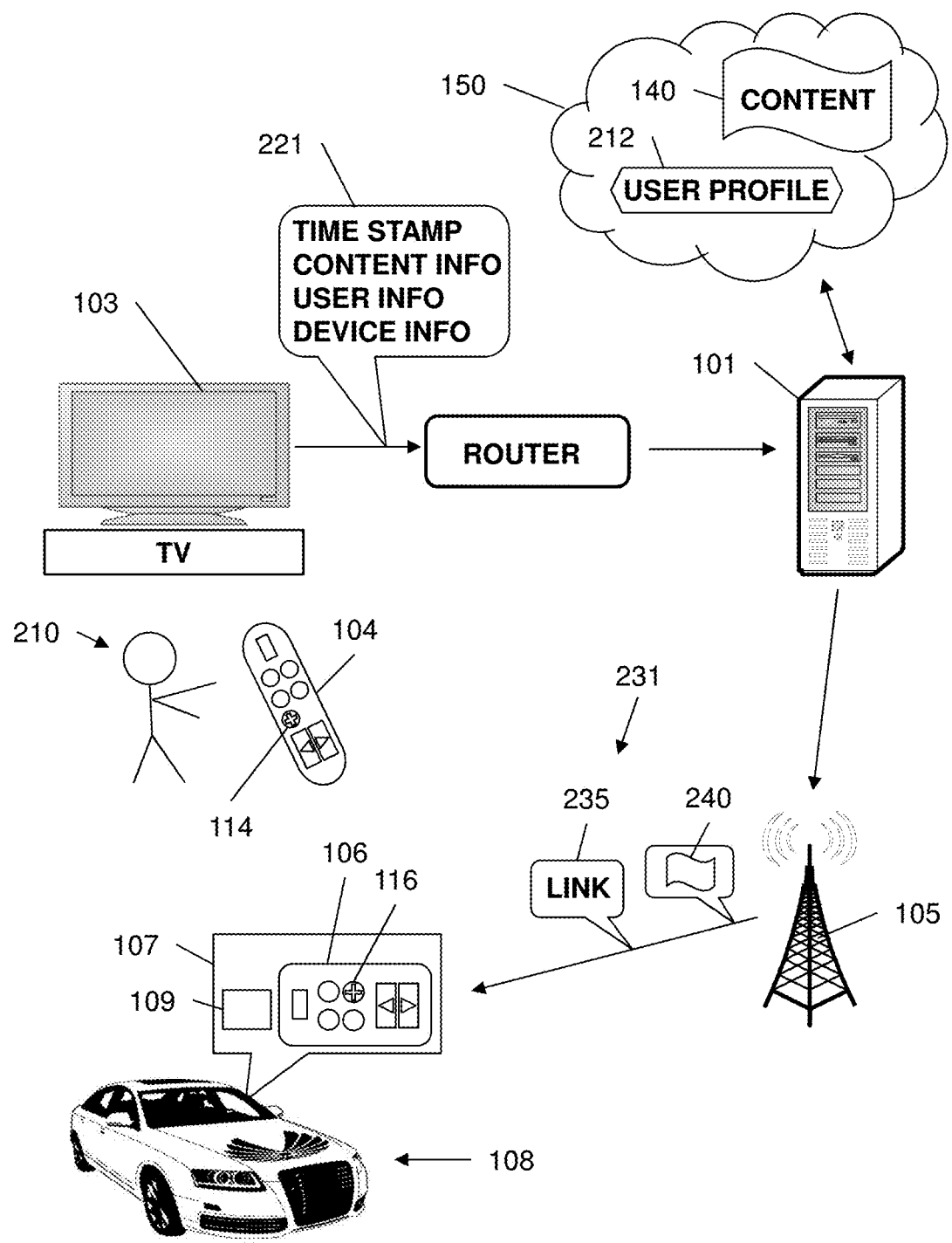
FIG. 2 schematically illustrates a procedure in which a user of the system of FIG. 1 can switch a video presentation from a home device to a car device, in accordance with embodiments of the disclosure.

FIG. 2 schematically illustrates a procedure 200 in which a user of system 100 can switch presentation of video content 120 from the home device to the car device, in accordance with embodiments of the disclosure. In an embodiment, user 210 presses button 114 to cause transmission of a signal 221 to server 101, requesting that the content be presented at a different device. Signal 221 can include a time stamp, an identifier of the content, a frame number of the content corresponding to the time the button 114 was pressed, and an identifier of the target device (in this embodiment, presentation device 107, controlled from control panel 106). In another embodiment, a soft button is provided on the screen of display 103; the user can send the signal 221 by touching the screen where the soft button is displayed.

In another embodiment, server 101 maintains a profile for user 210 (or has access to a profile 212 stored in cloud 150) that includes a list of one or more devices of the user. In this embodiment, signal 221 includes a user identifier that permits retrieval of the user profile. The user can access the profile and update the profile to specify which device is to be the target device. Alternatively, the user can indicate that all the listed devices are to be treated as target devices. In an embodiment, this can be a default condition so that the user is not required to specify a target device.

The server 101 responds to signal 221 by generating a message 231 (e.g. a short message using SMS or an email) and transmitting the message to an address or telephone number designated by the user. This address/number can be included in signal 221. Message 231 includes a link 235 to the content located in cloud 150. Content can then be delivered to the target device when the link is activated. In an embodiment, a mobile phone 109 can be integrated with presentation device 107, so that the message is delivered to device 107 using the telephone number for mobile phone 109.

In addition to message 231, a portion 240 of the video content 140 being consumed by the user is transmitted to the target device. In this embodiment, the video content portion 240 can correspond to a predetermined number of frames or a predetermined interval of time beginning at the point where the user pressed button 114 on remote control 104 (or a soft button provided on display 103). Video content portion 240 is received at device 107 in advance of the user activating the link. Video content portion 240 is therefore available for display at device 107 without delay (e.g. delay associated with buffering of the content or activation of the link).

Figure 3:
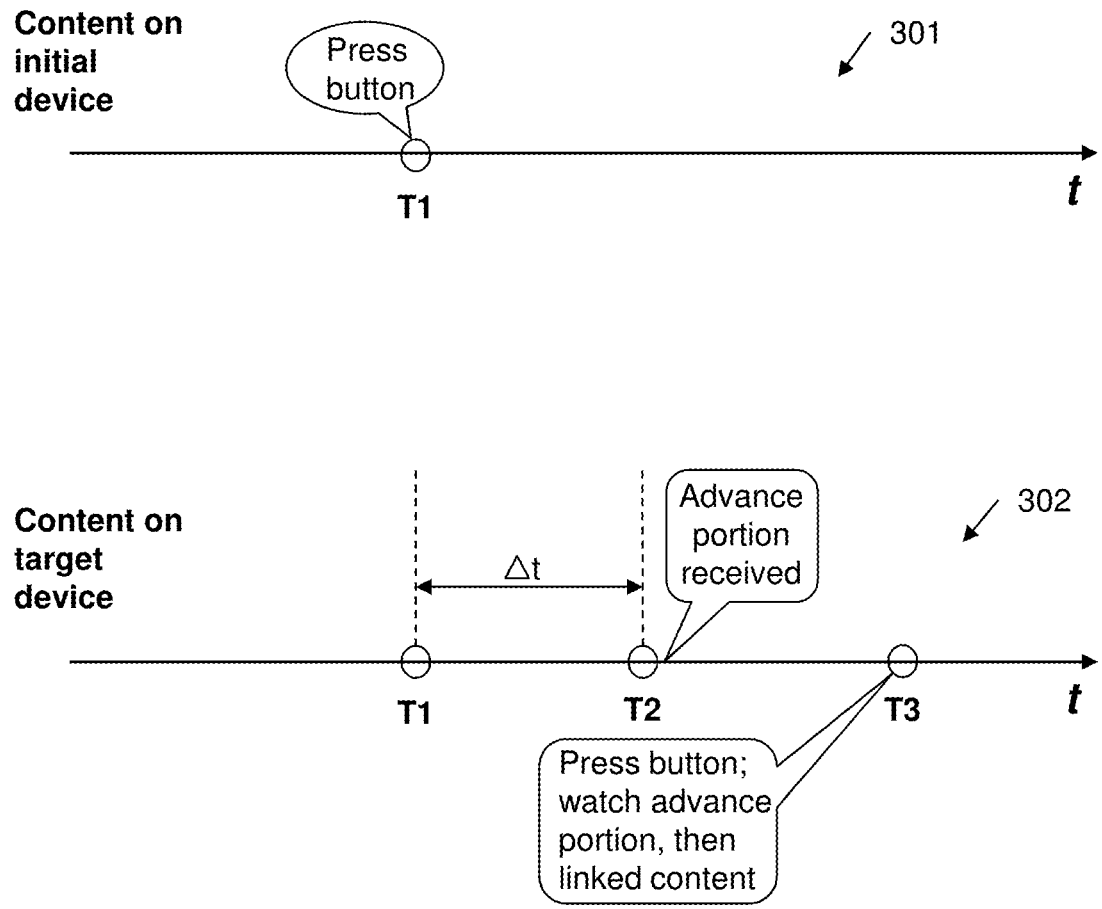
FIG. 3 depicts timelines for providing content to an initial device and a target device.

FIG. 3 depicts timelines 300 showing availability and display of content at an initial device (e.g. home display 103) and a target device (e.g. car device 107), in accordance with embodiments of the disclosure. The user watches content on the initial device up until time T1 (timeline 301), at which point he presses button 114. Content corresponding to the interval between T1 and T2 ($\Delta t$ on timeline 302) is sent as advance portion 240 to the target device. When the user takes some action (e.g. pressing button 116 at device 107) to activate the link 235 at time T3, the advance content portion 240 can be displayed immediately at the target device. In response to the link being activated, server 101 provides content to the target device corresponding to time beginning at T2.

The user can thus enjoy live content between two devices (content generated up to T1 on the initial device, after T1 on the target device) without missing any content.

In an embodiment, the user can choose to watch the content at a later time, without using a different device. In this instance, signal 221 identifies the current video display device as the target device. At a later time (e.g. time T3), the user can press button 114 again; the content beginning from T1 will be available to view at the display device 103, and begin to be displayed immediately.

Figure 4:
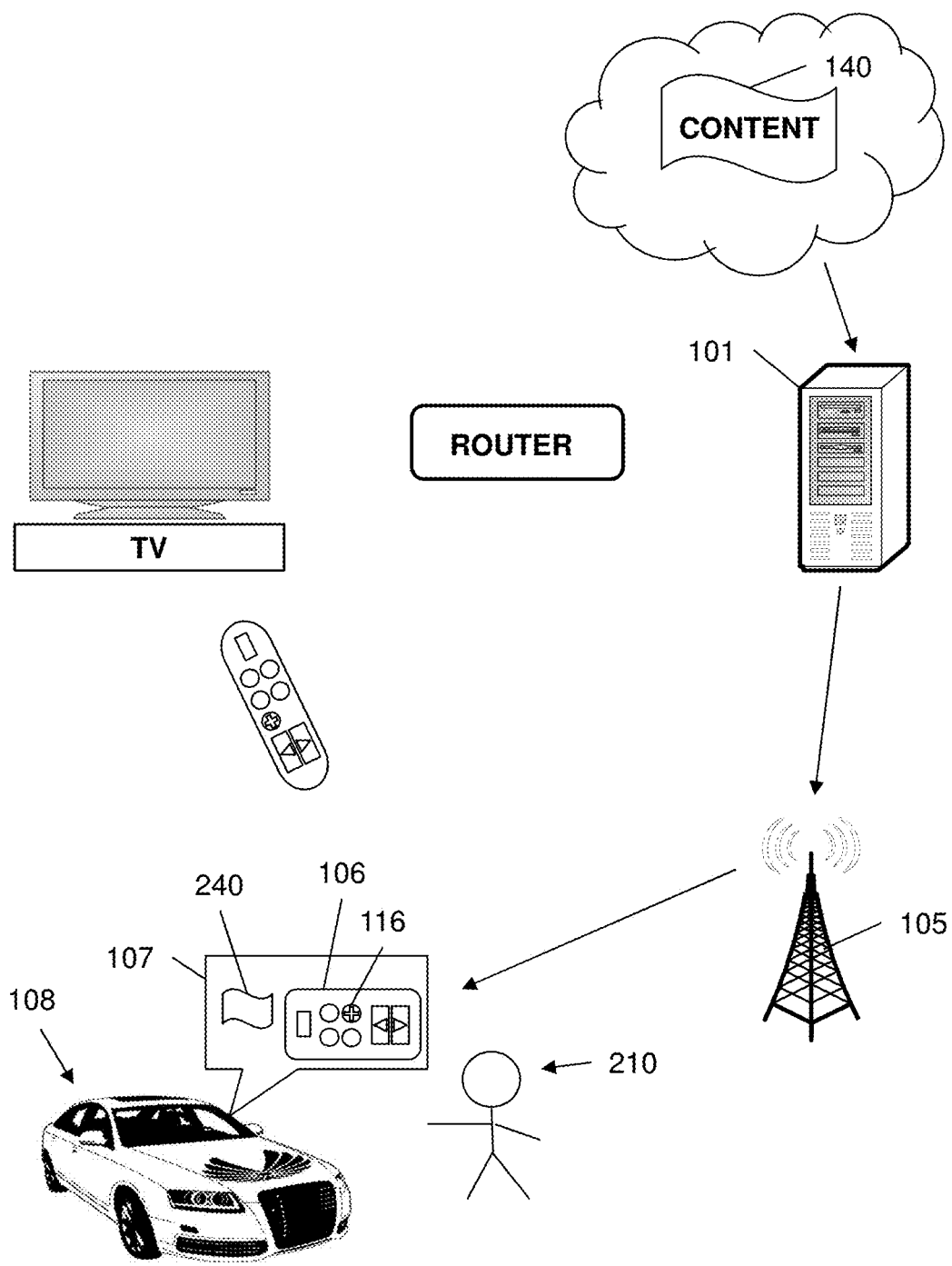
FIG. 4 schematically illustrates a procedure in which the user of FIG. 2 can watch the video presentation at the car device, in accordance with embodiments of the disclosure.

FIG. 4 schematically illustrates a procedure 400 in which user 210 can watch the video content 140 at the car device, in accordance with embodiments of the disclosure. As shown in FIG. 4, the video presentation device 107 has a control panel 106 including a button 116 for activating the link 235. Button 116 can be either a physical (hard) button installed in the car 108, or a soft button on a display of device 107. In this embodiment, content portion 240 is delivered to the car device in advance of user 210 pressing button 116, so that content portion 240 is displayed immediately. The user can thus watch the content 140 at device 107 without having missed any content since previously pressing button 114.

It will be appreciated that pressing button 116 may, in various embodiments, invoke a software application, send a request to access cloud storage, etc., to cause activation of the link 235. Since the content is delivered to the target device upon activation of the link, the user can have a one-touch viewing experience at the target video presentation device.

In another embodiment, content can begin playing at the target device 107 without the user having to activate the link 235. For example, the car can be provided with a sensor for detecting the user's presence; the content (beginning from the frame at which button 114 was pressed) can then be displayed when the user enters the car.

Figure 5:
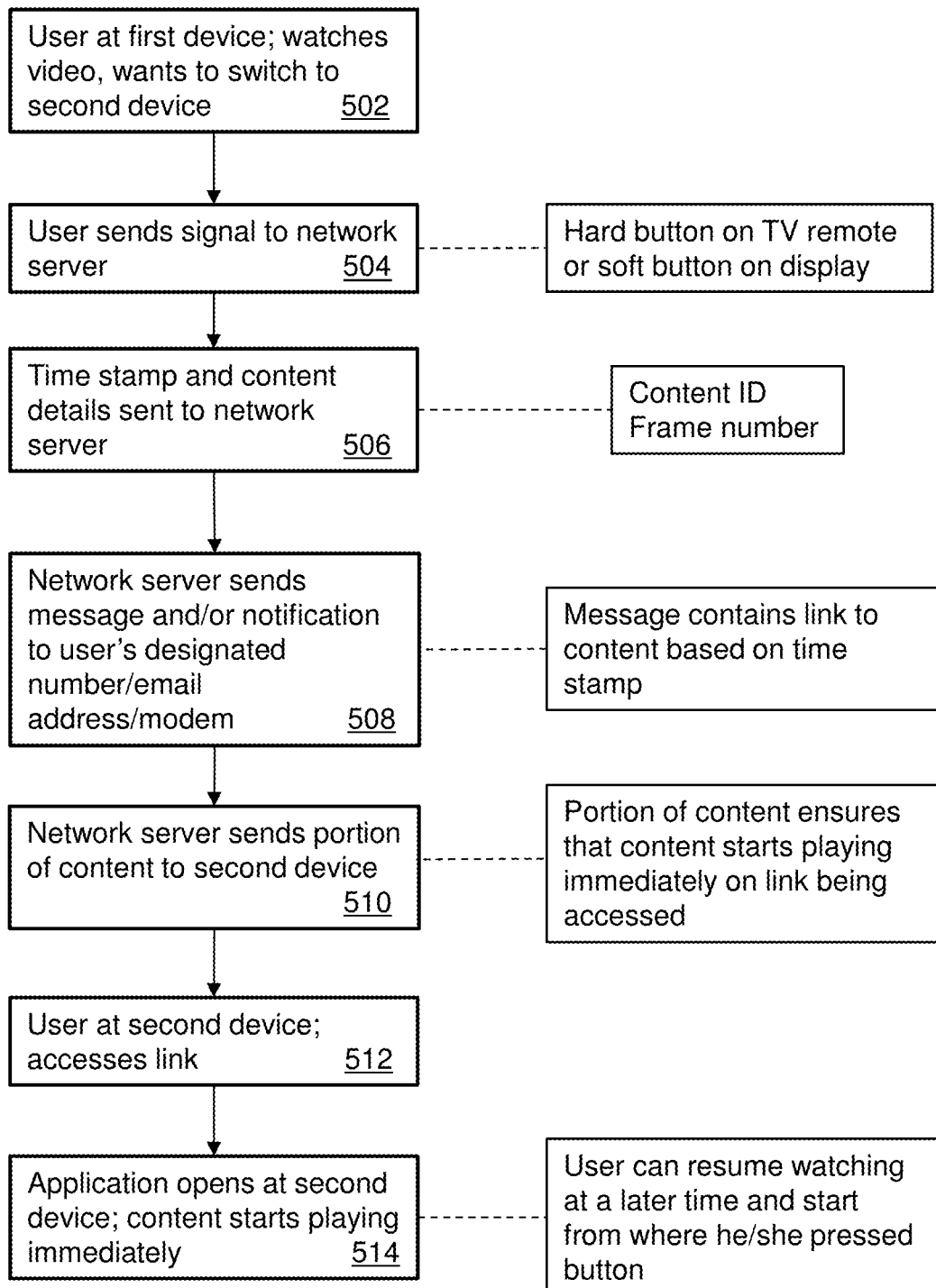
FIG. 5 is a flowchart depicting an illustrative embodiment of a method used in portions of the system described in FIGS. 1, 2 and 4.

FIG. 5 is a flowchart depicting an illustrative embodiment of a method 500 used with system 100, with reference to FIGS. 1, 2 and 4. In step 502, the user decides to switch from viewing content at a first device to a second device; he sends a signal to the network server (step 504) using a hard button or soft button as described above. A time stamp, together with details regarding the content (and specifying the target device, if needed) is sent to the network server (step 506). The network server sends a message (step 508) to an address or phone number designated by the user; the message contains a link to the content based on the time stamp.

In step 510, the network server sends a portion of the content to the second device; this ensures that content can start playing immediately when the link is activated. When the user arrives at the second device, he can access the link (step 512); this causes an application to open to provide content to the second device via the network server. The portion of content sent to the second device in step 510 is displayed immediately (step 514). If the user has returned to the first device (that is, the first and second devices are the same), the user can resume viewing the content from the point at which he pressed the button in step 504.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
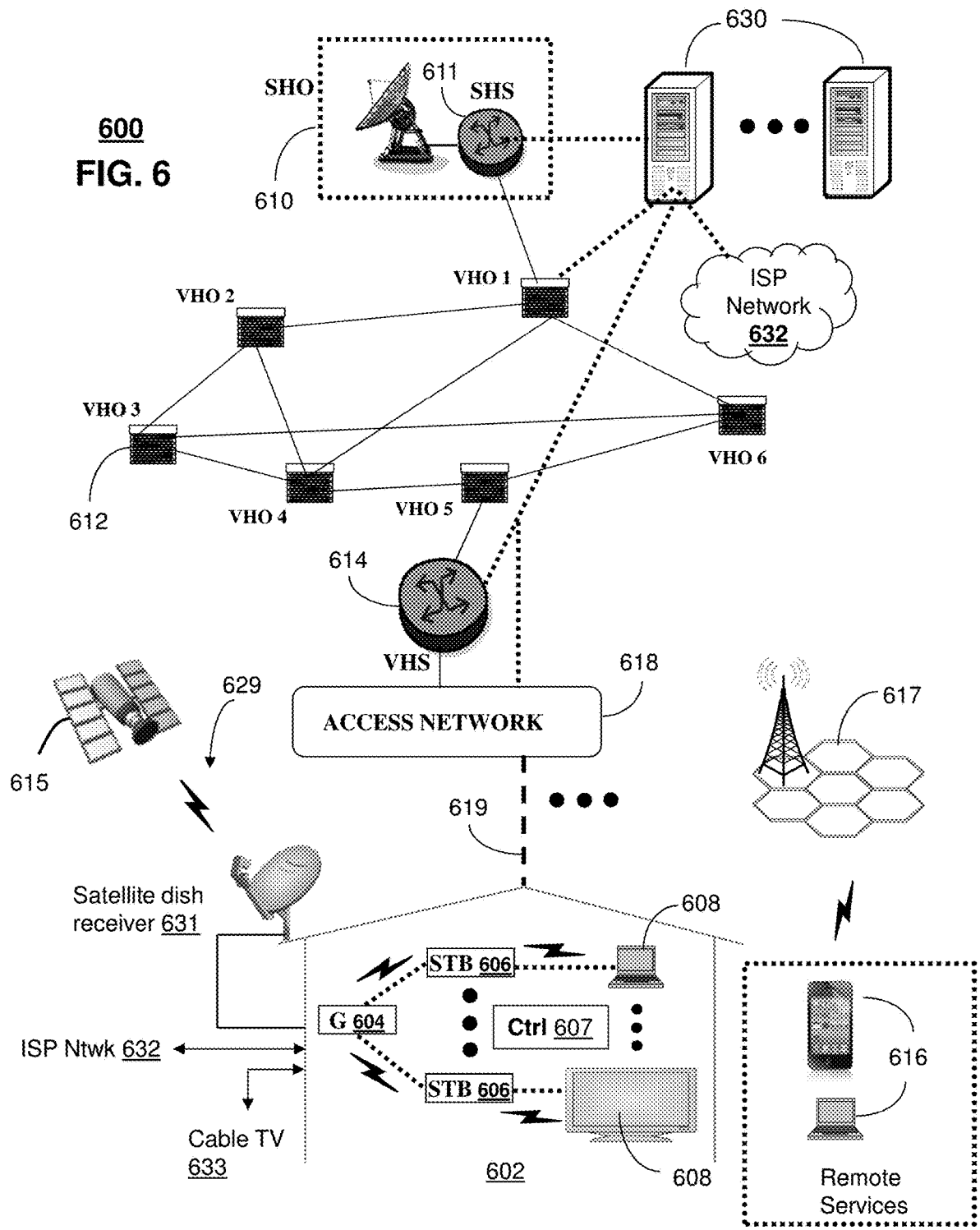
FIGS. 6-7 depict illustrative embodiments of communication systems that provide media services to the devices of FIGS. 1, 2 and 4.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with the systems of FIGS. 1, 2 and 4 as another representative embodiment of communication system 600. For instance, one or more devices illustrated in the communication system 600 of FIG. 6 can include a device including a processing system that includes a processor, and a memory that stores executable instructions that, when executed by the processing system, facilitate performance of operations. The operations can include receiving a signal transmitted from a first media presentation device presenting media content; the signal includes a request to discontinue providing the media content to the first media presentation device and begin providing the media content to a second media presentation device. The operations can also include transmitting a selectable software object to a destination associated with the second media presentation device; the destination is an address or a mobile phone number designated by a user of the second media presentation device. The operations can further include transmitting a portion of the media content to the second media presentation device; the portion of the media content corresponds to a predetermined time period commencing with transmission of the signal. The operations can also include providing the media content to the second media presentation device, responsive to selection of the software object. A single user input to the second media presentation device represents selection of the software object, the second media presentation device presents the portion of the media content in response to the selection of the software object, and the media content provided to the second media presentation device responsive to selection of the software object corresponds to a time period commencing with expiration of the predetermined time.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a media content server (herein referred to as server 630). The server 630 can use computing and communication technology to direct content to the initial and target presentation devices and transmit messages, which can include among other things, transmitting the advance portion of the content, in accordance with method 500. The media processors 606 and wireless communication devices 616 can be provisioned with software functions to utilize the services of server 630. For instance, functions of media processors 606 and wireless communication devices 616 can be similar to the functions described for the communication devices of FIGS. 1, 2 and 4, in accordance with method 500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
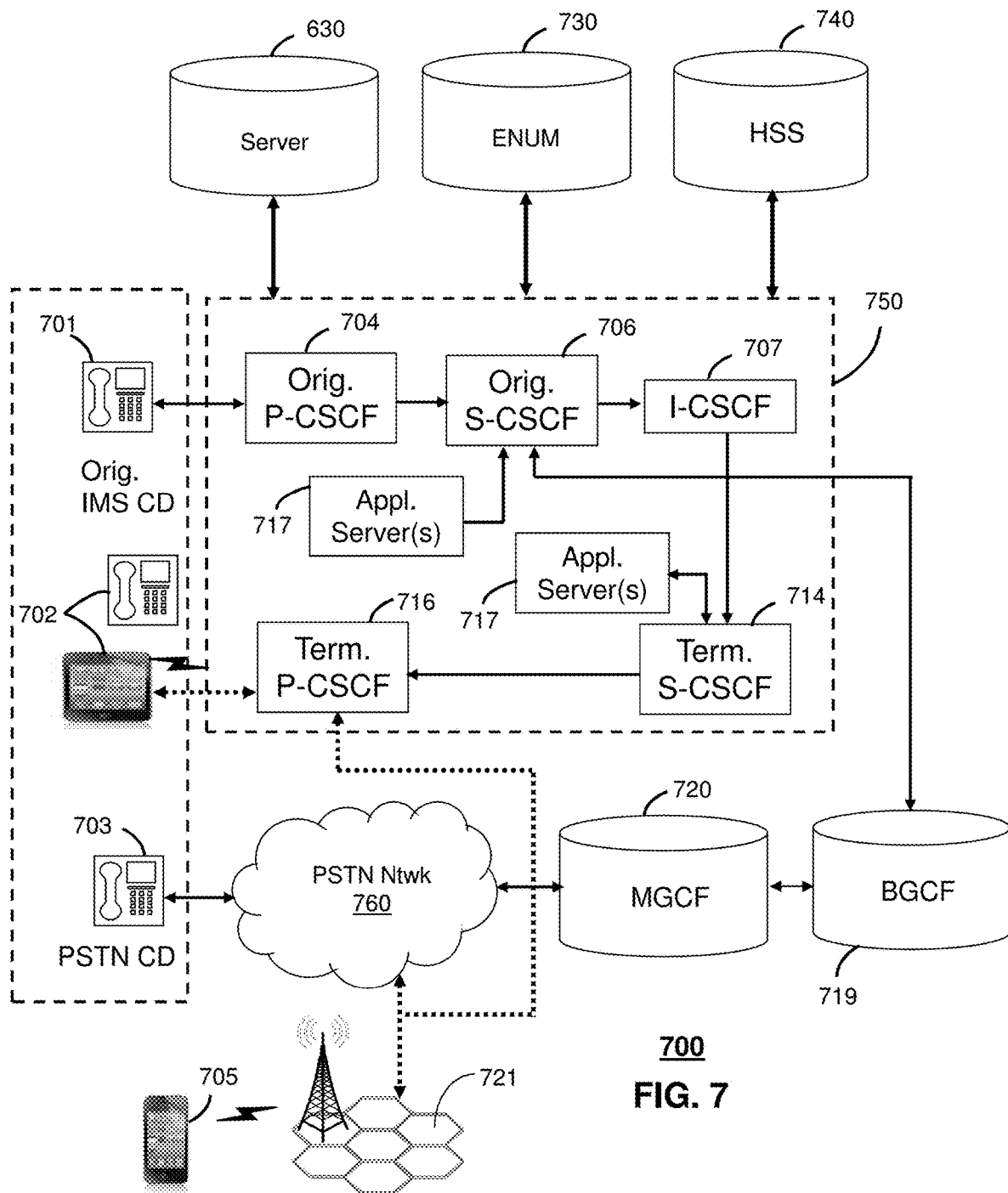

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with the systems of FIGS. 1, 2 and 4 and communication system 600 as another representative embodiment of communication system 600. The communication system can include a processing system to perform a method comprising receiving, by a processing system including a processor, a signal transmitted from a first media presentation device presenting media content; the signal includes a request to discontinue providing the media content to the first media presentation device and begin providing the media content to a second media presentation device. The method can also comprise transmitting a selectable software object to a destination associated with the second media presentation device, and transmitting a portion of the media content to the second media presentation device; the portion of the media content corresponds to a predetermined time period commencing with transmission of the signal. The method can also comprise providing, responsive to selection of the software object, the media content to the second media presentation device. The second media presentation device presents the portion of the media content in response to the selection of the software object, and the media content provided to the second media presentation device responsive to selection of the software object corresponds to a time period commencing with expiration of the predetermined time period.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can provide services to the CDs 701, 702, 703 and 705 of FIG. 7, which can be adapted with software to utilize the services of the server 630. Server 630 can be an integral part of the application server(s) 717, which can be adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
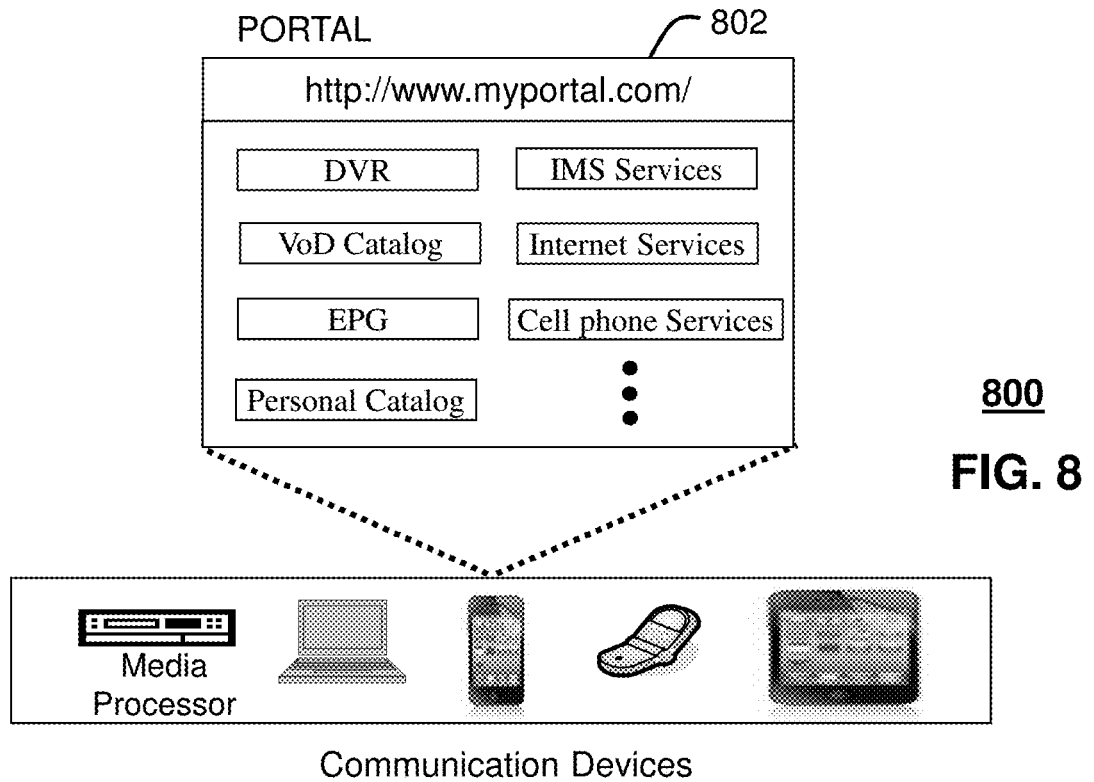
FIG. 8 depicts an illustrative embodiment of a web portal for interacting with the communication systems of FIGS. 1, 2, 4, 6 and 7.

FIG. 8 depicts an illustrative embodiment of a web portal 802 of a communication system 800. Communication system 800 can be overlaid or operably coupled with the systems of FIGS. 1, 2 and 4, communication system 600, and/or communication system 700 as another representative embodiment of communication system 600 and/or communication system 700. The web portal 802 can be used for managing services of communication systems 600-700. A web page of the web portal 802 can be accessed by a Uniform Resource Locator (URL) with an Internet browser using an Internet-capable communication device such as those described in FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications to adapt these applications as may be desired by subscribers and/or service providers of the systems of FIGS. 1, 2 and 4, and communication systems 600-700. For instance, can log into their on-line accounts and provision server 101 or server 630 with user profile 212, and so on. Service providers can log onto an administrator account to provision, monitor and/or maintain the systems of FIGS. 1, 2 and 4, or server 630.

Figure 9:
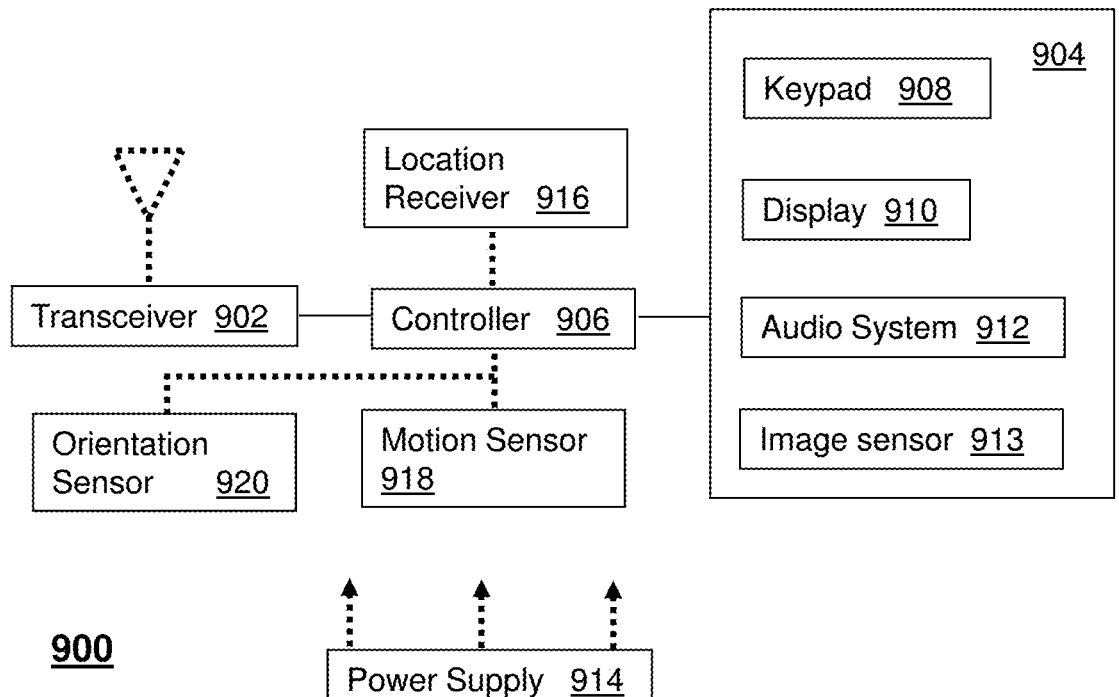
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1, 2, 4, and FIGS. 6-7 and can be configured to perform portions of method 500 of FIG. 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 700 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in systems of FIGS. 1, 2 and 4, and communication systems 600-700 of FIGS. 6-7 such as a gaming console and a media player.

Upon reviewing the aforementioned embodiments, it would be evident to an artisan with ordinary skill in the art that said embodiments can be modified, reduced, or enhanced without departing from the scope of the claims described below. For example, a user can designate the destination for message 231 when sending signal 221. In an embodiment, upon pushing button 114 the user is presented with a display on device 103, listing potential target devices. The user can then select a target device using directional buttons 115 on remote control device 104. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
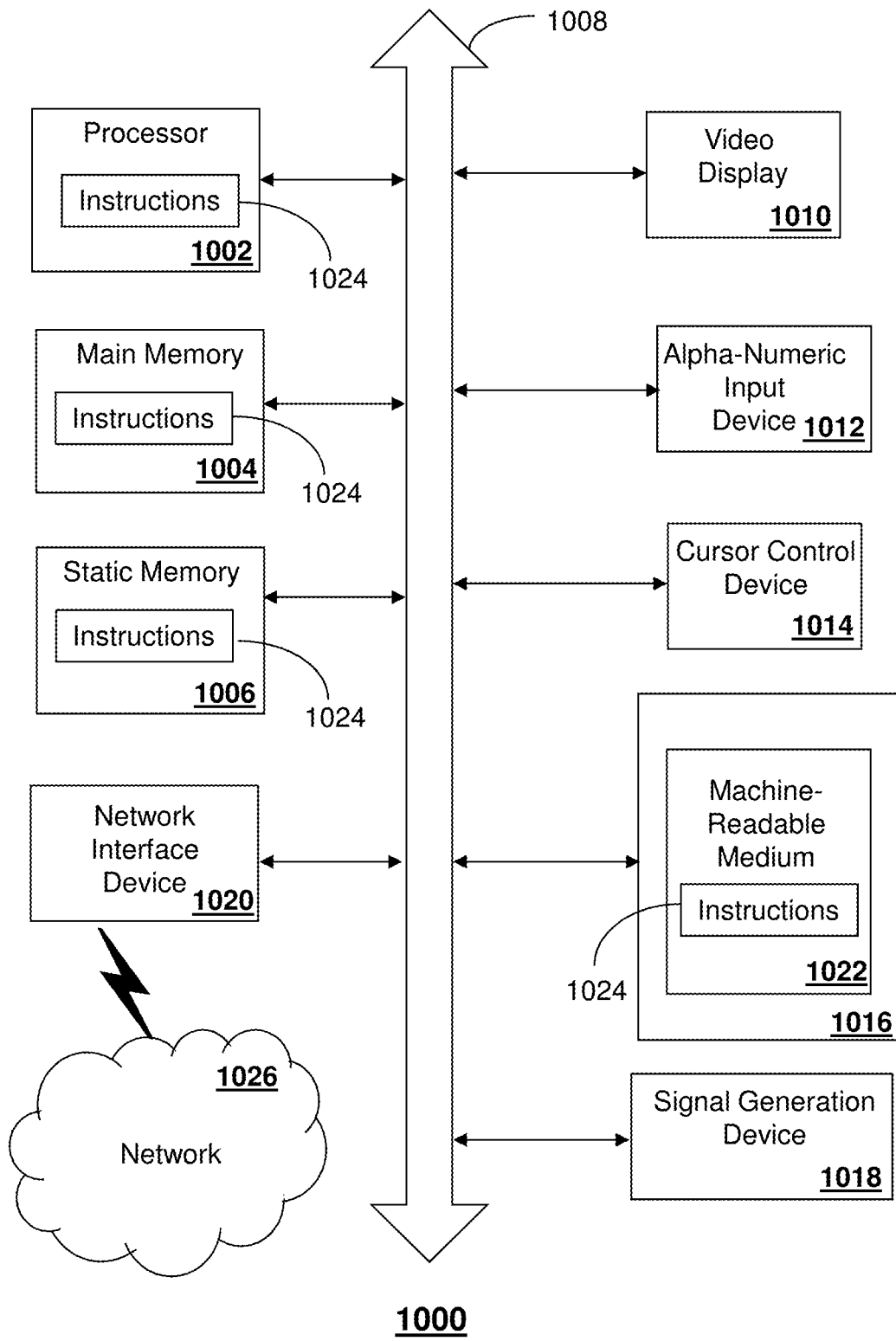
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the server 630, the media processor 606, the content server 101, video presentation devices 103, 107, and other devices of FIGS. 1-4. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine.

It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

transmitting, by a processing system including a processor, a portion of a media content to each of a plurality of second media presentation devices in response to receiving a signal transmitted from a first media presentation device, the signal comprising a request to discontinue providing the media content to the first media presentation device and begin providing the media content to the plurality of second media presentation devices, the portion of the media content corresponding to a predetermined time period commencing with a frame number of the media content that is associated with a time of a transmission of the signal; and responsive to a selection, by a particular one of the plurality of second media presentation devices, of a selectable software object subsequent to the transmitting of the portion of the media content, providing, by the processing system, the media content to the particular one of the plurality of second media presentation devices, the particular one of the plurality of second media presentation devices presenting the portion of the media content in response to the selection of the selectable software object, the predetermined time period being greater than zero, and the media content provided to the particular one of the plurality of second media presentation devices responsive to the selection of the selectable software object corresponding to a time period commencing with expiration of the predetermined time period.

2. The method of claim 1, wherein each of the plurality of second media presentation devices has a respective destination address or a respective mobile phone number.

3. The method of claim 2, wherein the processing system comprises a media content provider system to which a user is a subscriber, and wherein the media content comprises live content.

4. The method of claim 2, wherein the particular one of the plurality of second media presentation devices comprises an integrated mobile phone.

5. The method of claim 2, wherein a single user input to the particular one of the plurality of second media presentation devices represents the selection of the selectable software object.

6. The method of claim 5, wherein the single user input to the particular one of the plurality of second media presentation devices is performed via a soft button at the particular one of the plurality of second media presentation devices.

7. The method of claim 1, wherein the signal is initiated responsive to user input at a remote control for the first media presentation device.

8. The method of claim 1, wherein the signal includes an identifier of the media content.

9. The method of claim 1, wherein the signal includes a user identifier, and wherein the method further comprises retrieving, by the processing system, a user profile based on the user identifier.

10. The method of claim 1, wherein the selectable software object and the portion of the media content are transmitted via a cellular network.

11. A device, comprising:
a processing system including a processor; and
a memory that stores executable instructions that, when executed by the processing system, facilitate performance of operations, the operations comprising:
transmitting a portion of a media content to each of a plurality of second media presentation devices in response to receiving a signal transmitted from a first media presentation device, the signal comprising a request to discontinue providing the media content to the first media presentation device and begin providing the media content to the plurality of second media presentation devices, each of the plurality of second media presentation devices being associated with a respective address or a respective mobile phone number, and the portion of the media content corresponding to a predetermined time period commencing with a frame number of the media content that is associated with a time of a transmission of the signal; and
responsive to a selection, by a particular one of the plurality of second media presentation devices, of a selectable software object subsequent to the transmitting of the portion of the media content, providing the media content to the particular one of the plurality of second media presentation devices,
a single user input to the particular one of the plurality of second media presentation devices representing the selection of the selectable software object,
the particular one of the plurality of second media presentation devices presenting the portion of the media content in response to the selection of the selectable software object,
the predetermined time period being greater than zero; and
the media content provided to the particular one of the plurality of second media presentation devices responsive to the selection of the selectable software object corresponding to a time period commencing with expiration of the predetermined time period.

12. The device of claim 11, wherein the processing system comprises a media content provider system to which a user is a subscriber.

13. The device of claim 11, wherein the media content comprises live content.

14. The device of claim 11, wherein the signal includes an identifier of the media content.

15. The device of claim 11, wherein the signal includes a user identifier, and wherein the operations further comprise retrieving a user profile based on the user identifier.

16. A non-transitory machine-readable storage medium comprising executable instructions that, when executed by a processing system including a processor, facilitate performance of operations, the operations comprising:
transmitting a portion of a media content to each of a plurality of second media presentation devices in response to receiving a signal transmitted from a first media presentation device, the signal comprising a request to discontinue providing the media content to the first media presentation device and begin providing the media content to the plurality of second media presentation devices, the portion of the media content corresponding to a predetermined number of frames with a starting point and an ending point, the starting point corresponding to a frame number of the media content that is associated with a time of a transmission of the signal and the ending point corresponding to a point that is subsequent to the starting point; and
responsive to a selection, by a particular one of the plurality of second media presentation devices, of a selectable software object subsequent to the transmitting of the portion of the media content, providing the media content to the particular one of the plurality of second media presentation devices,
the particular one of the plurality of second media presentation devices presenting the portion of the media content in response to the selection of the selectable software object, and
the media content provided to the particular one of the plurality of second media presentation devices responsive to the selection of the selectable software object corresponding to a time period commencing with the ending point of the portion of the media content.

17. The non-transitory machine-readable storage medium of claim 16, wherein a single user input to the particular one of the plurality of second media presentation devices represents the selection of the selectable software object.

18. The non-transitory machine-readable storage medium of claim 17, wherein the processing system comprises a media content provider system to which a user is a subscriber, and wherein the media content comprises live content.

19. The non-transitory machine-readable storage medium of claim 16, wherein the signal includes an identifier of the media content.

20. The non-transitory machine-readable storage medium of claim 16, wherein the signal includes a user identifier, and wherein the operations further comprise retrieving a user profile based on the user identifier.

* * * * *